US010928824B2

(12) United States Patent
Huai

(10) Patent No.: US 10,928,824 B2
(45) Date of Patent: Feb. 23, 2021

(54) SYSTEM FOR CUSTOMIZING THE OPERATION OF A SELF-DRIVING MOTOR VEHICLE

(71) Applicant: Xiaoning Huai, Sunnyvale, CA (US)

(72) Inventor: Xiaoning Huai, Sunnyvale, CA (US)

(73) Assignee: Real Imaging Technology Co. Ltd, Shenzhen (CN)

( * ) Notice: Subject to any disclaimer, the term of this patent is extended or adjusted under 35 U.S.C. 154(b) by 0 days.

(21) Appl. No.: 16/926,654

(22) Filed: Jul. 11, 2020

(65) Prior Publication Data

US 2020/0348677 A1 Nov. 5, 2020

Related U.S. Application Data

(63) Continuation of application No. 16/101,282, filed on Aug. 10, 2018, now Pat. No. 10,775,800, which is a continuation of application No. 15/867,946, filed on Jan. 11, 2018, now Pat. No. 10,642,276, which is a continuation of application No. 15/810,068, filed on Nov. 12, 2017, now abandoned, which is a continuation of application No. 15/662,282, filed on (Continued)

(30) Foreign Application Priority Data

Jun. 26, 2017 (CN) ......................... 201710490689.4
Jul. 13, 2017 (CN) ......................... 201710568488.1
Oct. 22, 2017 (CN) ..................... 201710119892.120
Nov. 28, 2017 (CN) ......................... 201711212892.1

(51) Int. Cl.

| | |
|---|---|
| ***G05D 1/02*** | (2020.01) |
| ***B60W 40/09*** | (2012.01) |
| ***G05D 1/00*** | (2006.01) |
| ***H04L 29/08*** | (2006.01) |
| ***B60W 50/00*** | (2006.01) |
| ***B60W 50/08*** | (2020.01) |
| ***G06K 9/62*** | (2006.01) |

(52) U.S. Cl.

CPC ........... *G05D 1/0221* (2013.01); *B60W 40/09* (2013.01); *B60W 50/0098* (2013.01); *B60W 50/08* (2013.01); *G05D 1/0088* (2013.01); *G05D 1/0214* (2013.01); *G06K 9/6262* (2013.01); *H04L 67/306* (2013.01); *B60W 2050/0082* (2013.01); *B60W 2050/0089* (2013.01); *B60W 2540/043* (2020.02)

(58) Field of Classification Search

CPC .. G05D 1/0221; G05D 1/0214; G05D 1/0088; G05D 1/0276; G05D 2201/02; B60W 50/0098; B60W 50/08; B60W 40/09; B60W 2540/043; B60W 2050/0089; B60W 2050/0082; G06K 9/6262; H04L 67/306

USPC ........................................................... 701/23

See application file for complete search history.

(56) References Cited

U.S. PATENT DOCUMENTS

2015/0233719 A1* 8/2015 Cudak .................... G01C 21/26 701/23
2016/0001781 A1* 1/2016 Fung ..................... B60W 40/08 701/36

(Continued)

*Primary Examiner* — Muhammad Shafi

(57) ABSTRACT

Disclosed are methods and a system for customizing operation of a self-driving motor vehicle according to operation behaviors preferred by an individual passenger wherever needed, promising to provide an experience as if the self-driving motor vehicle is driven by the mind of the passenger the first time it operates on a public roadway.

3 Claims, 8 Drawing Sheets

710
Scenario 1
Scenario 2
Scenario 3
User preferred behavior
Generic approach
711
712
The shaded area denotes a range of fuzzy operation behaviors without user customization, within the restraint of traffic rules and laws, and the dashed arrow indicates an unpredictable operation in the scenario.
Module 712 comprises 711, 712 denotes a range of operation behaviors with user customization, within the restraint of broader laws comprising traffic rules and laws, incorporating user attributes. The oval dots denote selective operation behaviors, and the solid thick arrow indicates generating a scenario-user-choice pair by a user choice.
700
The training collection of scenarios and selective operation behaviors in each of the scenarios.

Related U.S. Application Data

Jul. 28, 2017, now Pat. No. 10,365,648, which is a continuation of application No. 15/640,528, filed on Jul. 1, 2017, now abandoned, which is a continuation of application No. 15/619,581, filed on Jun. 12, 2017, now abandoned.

(56) References Cited

U.S. PATENT DOCUMENTS

| | | | | |
|---|---|---|---|---|
| 2016/0187879 | A1* | 6/2016 | Mere | G05D 1/0061 701/23 |
| 2016/0232785 | A1* | 8/2016 | Wang | G08G 1/012 |
| 2016/0314224 | A1* | 10/2016 | Wei | G06F 17/5009 |
| 2017/0217445 | A1* | 8/2017 | Tzirkel-Hancock | B60W 50/08 |
| 2017/0267256 | A1* | 9/2017 | Minster | G01C 21/3461 |
| 2017/0362076 | A1* | 12/2017 | Hall | H04W 4/029 |
| 2018/0174446 | A1* | 6/2018 | Wang | G08G 1/0112 |

* cited by examiner

FIG.4

Table 1.

| Response time to events / Factory/ Personalized settings | 0 - T1: The Blinking Zone | T1-T2: The Emergency Zone | T2 and beyond: The Cruise Zone |
|---|---|---|---|
| Factory settings | Per factory designs based on common behaviors | Per factory designs based on common behaviors | Per factory designs based on common behaviors |
| Impact of User attributes data on operation | Apply scenario-user-choice pair data in damage control options and alarms | Apply scenario-user-choice pair data and user profile data in operation | Apply scenario-user-choice pair data and user profile data in operation |

The training collection of scenarios and selective operation behaviors in each of the scenarios.

810
Scenario 1
Scenario 2
Scenario 3
User Choice
Generic Design
820
812
811
Traits/Operational Behavior
880
probability density
distribution of ethics
Selfish
Altruism
818

SYSTEM FOR CUSTOMIZING THE OPERATION OF A SELF-DRIVING MOTOR VEHICLE

The present application is a continuation of U.S. application Ser. No. 16/101,282 filed Oct. 8 2018, which claims priority to U.S. Ser. No. 15/867,946, filed Jan. 11, 2018, each of which is herein incorporated by reference in its entirety.

TECHNICAL FIELD

Artificial intelligence; self-driving motor vehicles.

BACKGROUND

Figure 1:
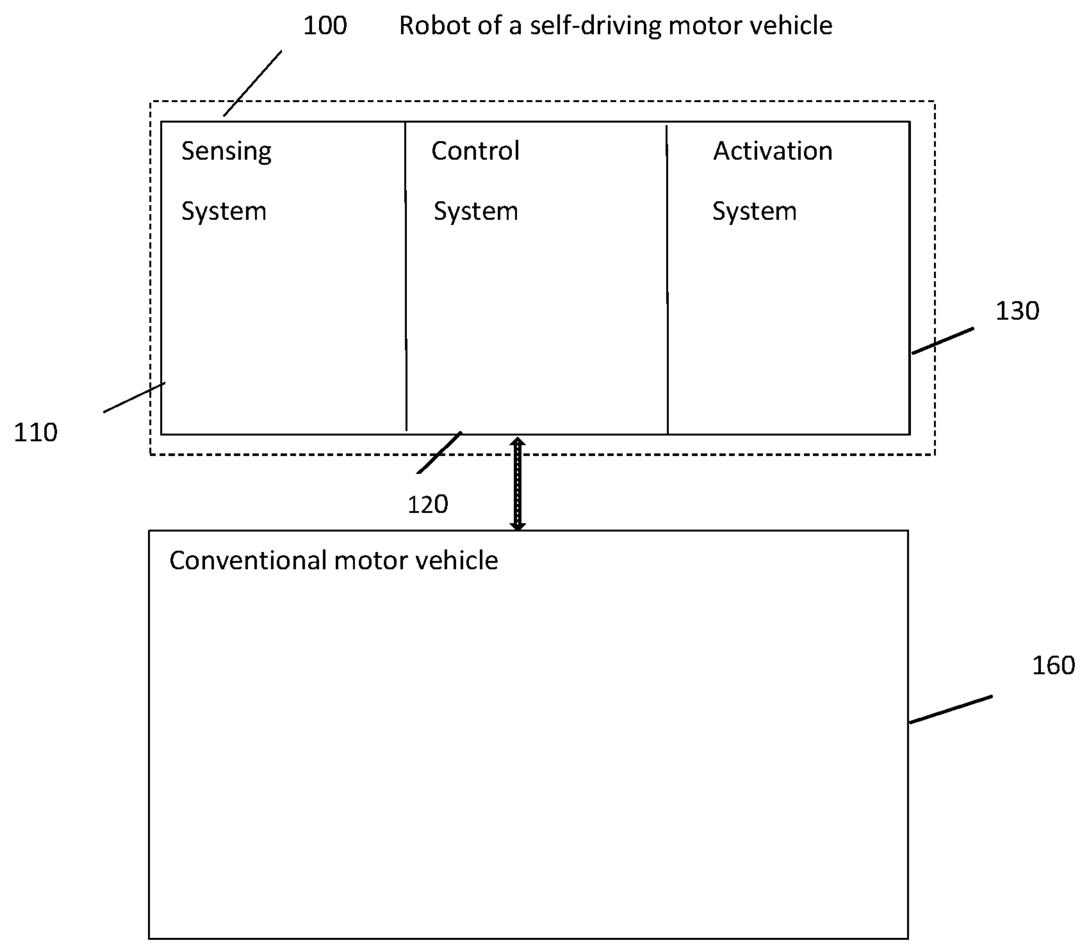

Driving automation based on artificial intelligence has evolved now to a stage of road tests by self-driving motor vehicle manufacturers. Among other issues, accidents are occasionally reported calling for more improvements. A self-driving motor vehicle could be viewed as if a robot sits on a conventional motor vehicle, though it does not take the shape of what is commonly presented or perceived comprising a Sensing System, a Control System and an Activation System, while the conventional motor vehicle should be altered significantly for a better integration, as illustrated in FIG. 1. A self-driving motor vehicle drives itself from one start point to a destination set by a user or a remote controller through a wireless communication system or an electronic media device and guided by an automatic navigational system with or without involving a user in the vehicle. It can carry one or more passengers or no passengers, for example when it is sent for a passenger. A robot on the self-driving motor vehicle monitors the scenarios in driving including detecting roadway conditions and traffic signs and/or signals and various other factors that impact its operation, matching against scenarios modelled in its internal data structures and determines proper operation behaviors according to the traffic rules, just like human drivers do. However, driving as a human activity has more attributes than just moving or transportation, comprising safety, comfort, exercise, sport and so on, which vary according to experiences, favors, moral and/or ethics traits of individual drivers or passengers among other things. In a scenario of an emergency or an accident, different passengers or riders tend to have different preferred operation behaviors by a self-driving motor vehicle, concerning responsibilities, liabilities, and damage controls to different parties involved, and possible other issues of conflicting interest, which could be very difficult if ever possible for a self-driving motor vehicle with generic factory settings to render operation behaviors preferred by each individual passenger or rider in such a scenario. From vehicle operation point of view, a fundamental difference between a conventional and a self-driving motor vehicle is that the former provides an essential platform for a driver to exercise the operation, while the latter tries to provide a ubiquitous platform essentially without involving a driver in its operation. Although there have been vigorous researches on self-driving motor vehicles adapting to a passenger or rider after it is on the road in the state of art technologies, rare work is reported on customizing a self-driving motor vehicle in manufacture of a self-driving motor vehicle or before a self-driving motor vehicle is practically used by a user. There is no country or area in the world where a vehicle licensee has been issued to a self-driving motor vehicle today.

SUMMARY OF THE INVENTION

A key idea for this invention is to have a self-driving motor vehicle manufactured and/or trained as if being driven by the mind instead of hands of each passenger it serves the first day on a journey.

Disclosed is a method of customizing a self-driving motor vehicle by personalizing and/or disciplining the self-driving motor vehicle before the self-driving motor vehicle is practically used in a service on a public roadway and applying and/or refining the customizing during driving.

Introduced is a customized driving protocol for self-driving motor vehicles comprising:

obtaining a training collection of data of a plurality of scenarios and a collection of data of operation behaviors of a self-driving motor vehicle in each of the scenarios, wherein the training collection are verified and/or verifiable by simulation and/or road tests and the operation behaviors of a self-driving motor vehicle in each of the scenarios are lawful;

acquiring a scenario-user-choice pair data set based on the training collection and acquiring a user profile data set of one or more users of the self-driving motor vehicle in manufacturing the self-driving motor vehicle and/or prior to driving the self-driving motor vehicle on a public roadway in a practical service;

identifying a current rider, or one of current riders of the self-driving motor vehicle to be the current user, wherein data have been acquired in the entry of the current user in the scenario-user-choice pair data set and in the entry of the current user in the user profile data set of the self-driving motor vehicle prior to the self-driving motor vehicle being practically used on a public roadway;

driving the self-driving motor vehicle based on the scenario-user-choice pair data set and/or the user profile data set, comprising:

finding a match between a current scenario and a scenario in a scenario-user-choice pair in the entry of the current user in the scenario-user-choice pair data set;

operating the self-driving motor vehicle according to the user choice in the scenario-user-choice pair if the match is found, and the current user assumes at least partial responsibilities for consequences of the operating, or generating operation behaviors of the self-driving motor vehicle if the match is not found and estimating probability for the current user to choose each of the operation behaviors referencing data in the entry of the current user in the user profile data set and data from statistical analysis of data of motor vehicle driving records and/or psychological behavior of drivers, and electing an operation behavior having the largest probability to operate the self-driving motor vehicle.

Disclosed is also a system for customizing and legalizing a self-driving motor vehicle based on the customized driving protocol.

An embodiment of designing a training collection and embodiments of matching a scenario are also presented.

BRIEF DISCUSSION OF DRAWINGS

FIG. 1 Illustration of a functional structure of a self-driving motor vehicle.

Figure 2:
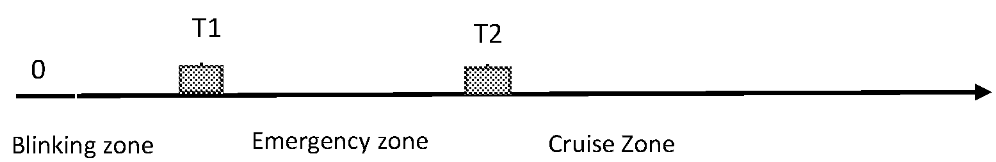

FIG. 2 Illustration of categorized response time interval to roadway and traffic events, the shaded area around T1 and T2 indicate it should be considered as a zone with a boundary varying from model to model, and from time to time.

Figure 3:
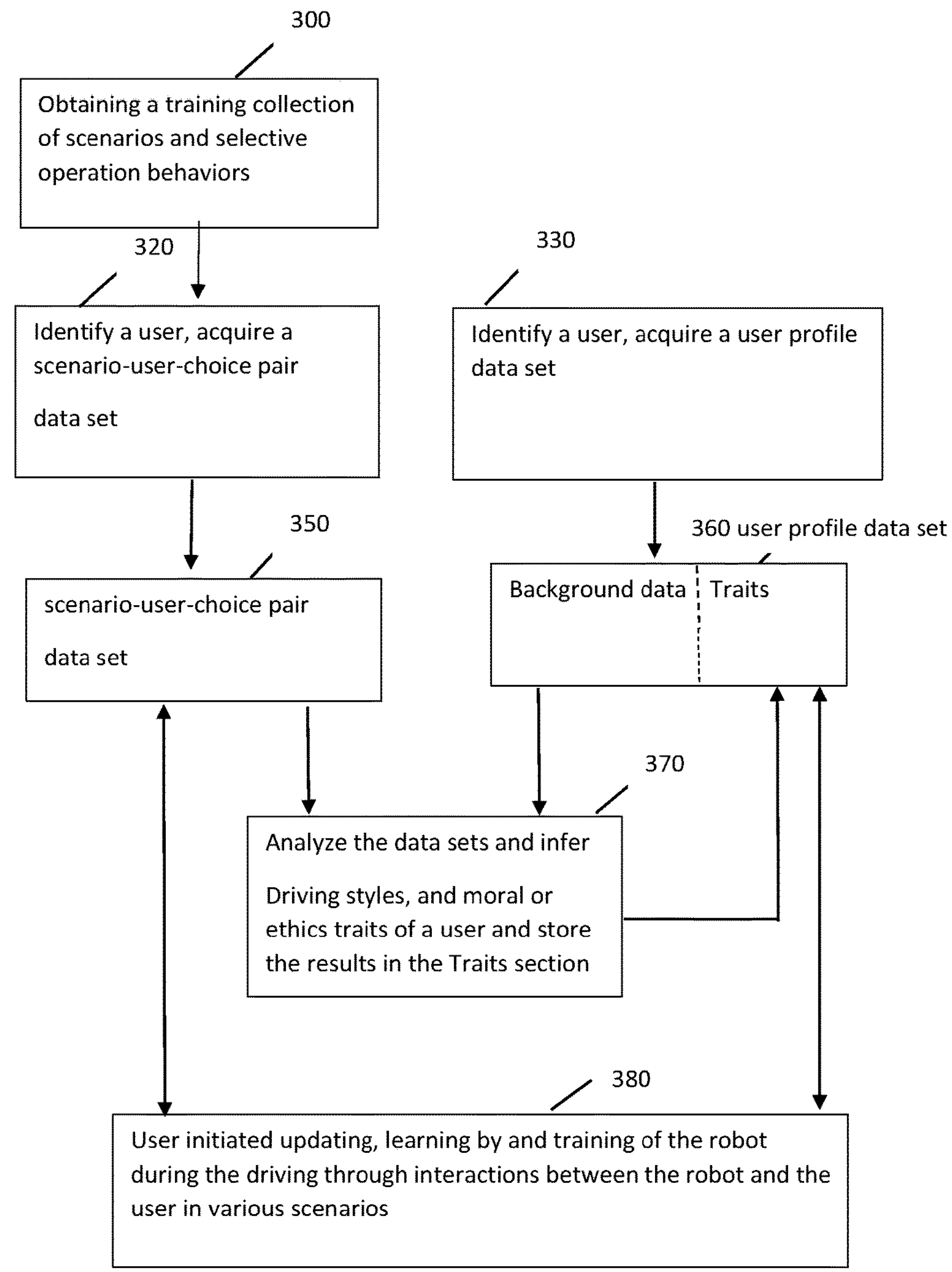

FIG. 3 Illustration of the procedures to customize a self-driving motor vehicle.

FIG. 4 Table 1, Example impacts on operation of a self-driving motor vehicle by the user data sets.

Figure 5:
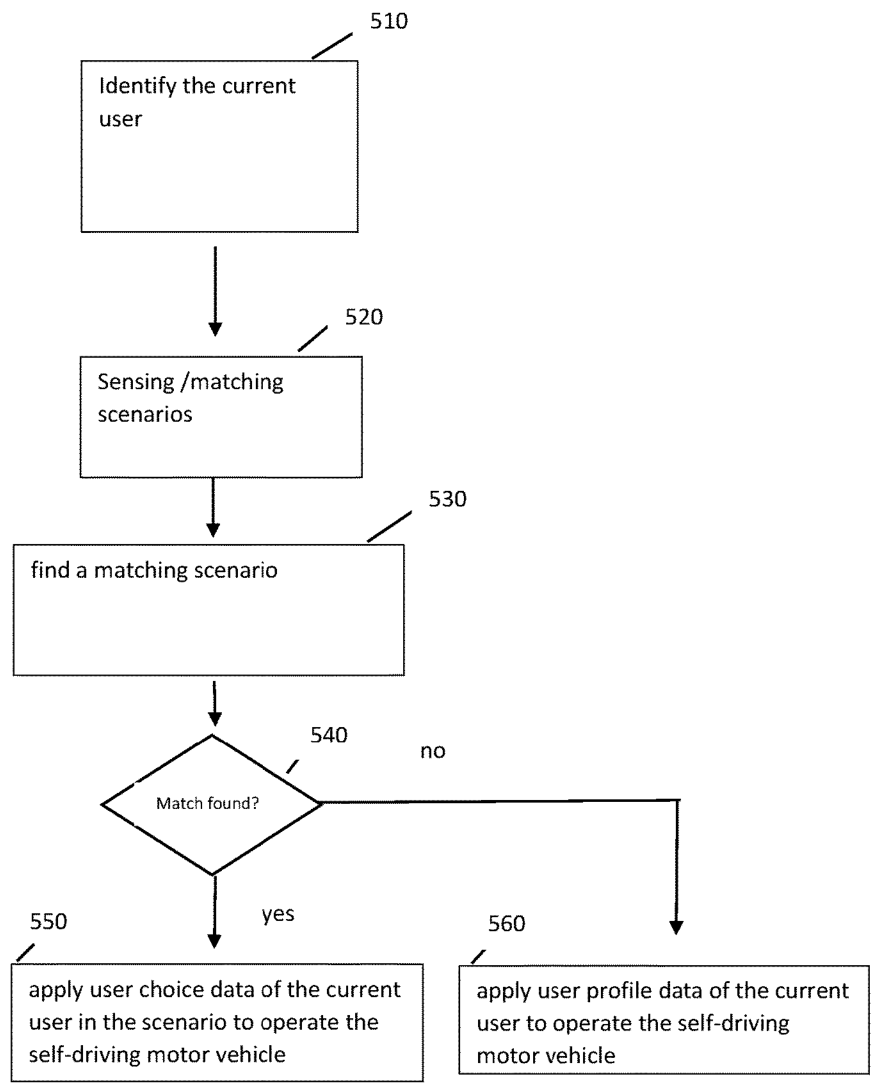

FIG. 5 Illustration of how to apply user data in self-driving.

Figure 6:
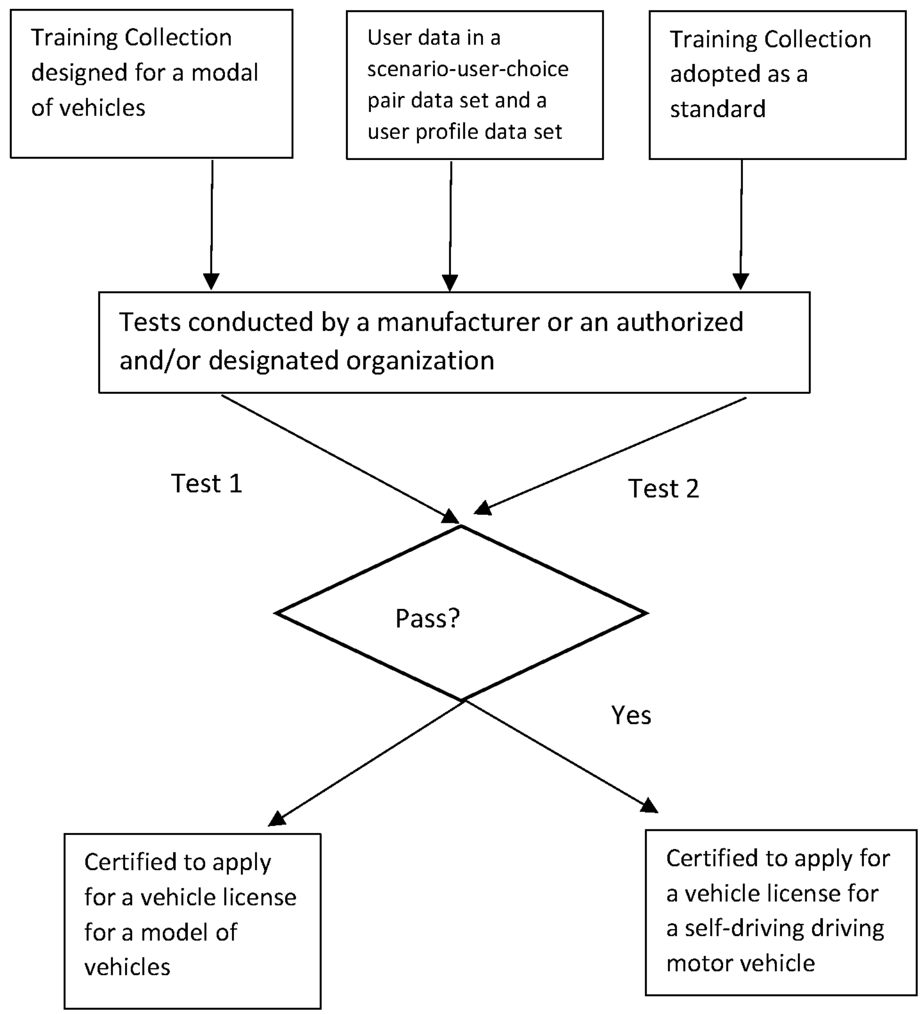

FIG. 6 Illustration of the process for legalizing a self-driving motor vehicle.

Figure 7:
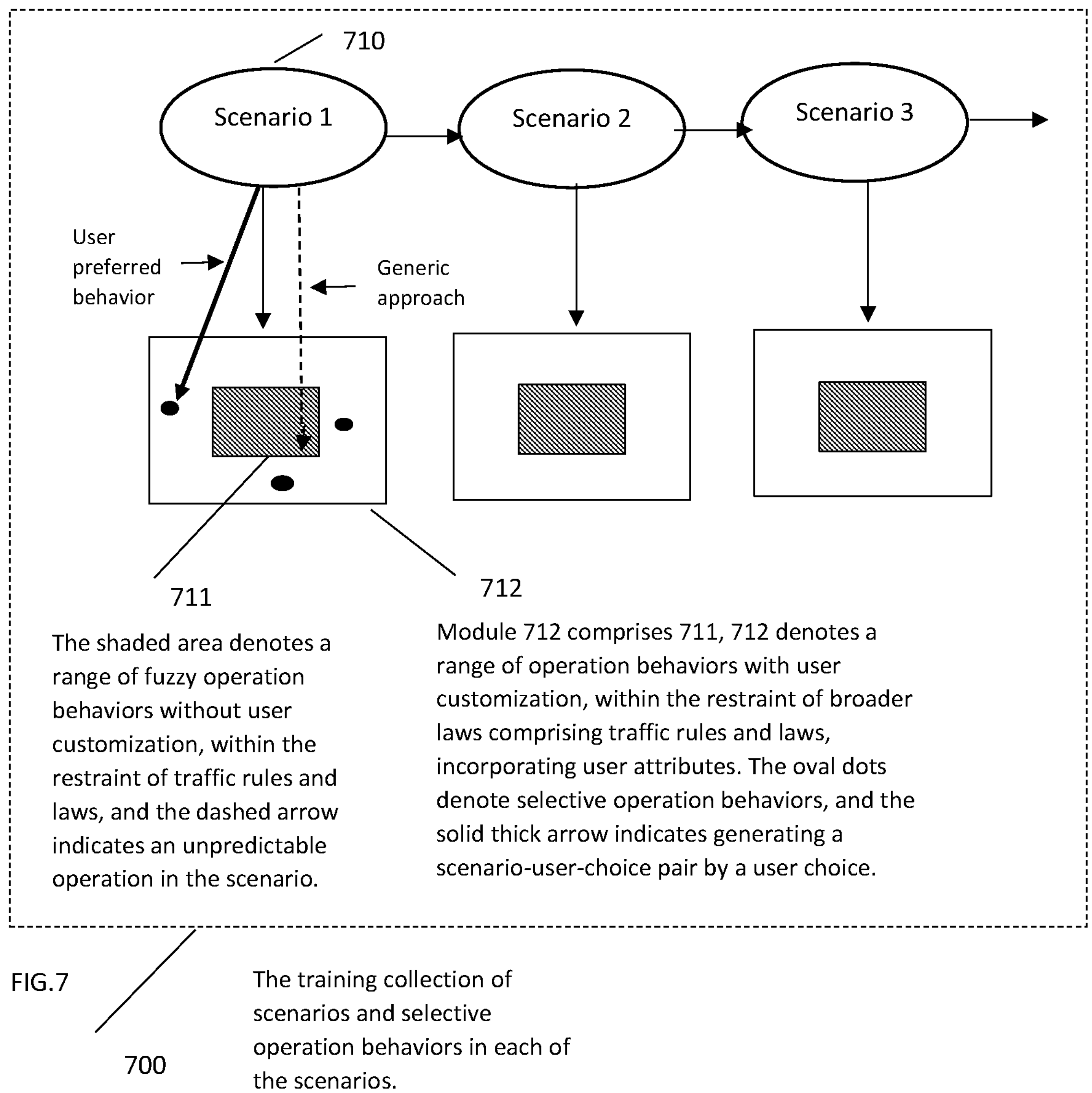

FIG. 7 Illustration of a comparison of different operation behaviors of customized and non-customized generic self-driving motor vehicles.

Figure 8:
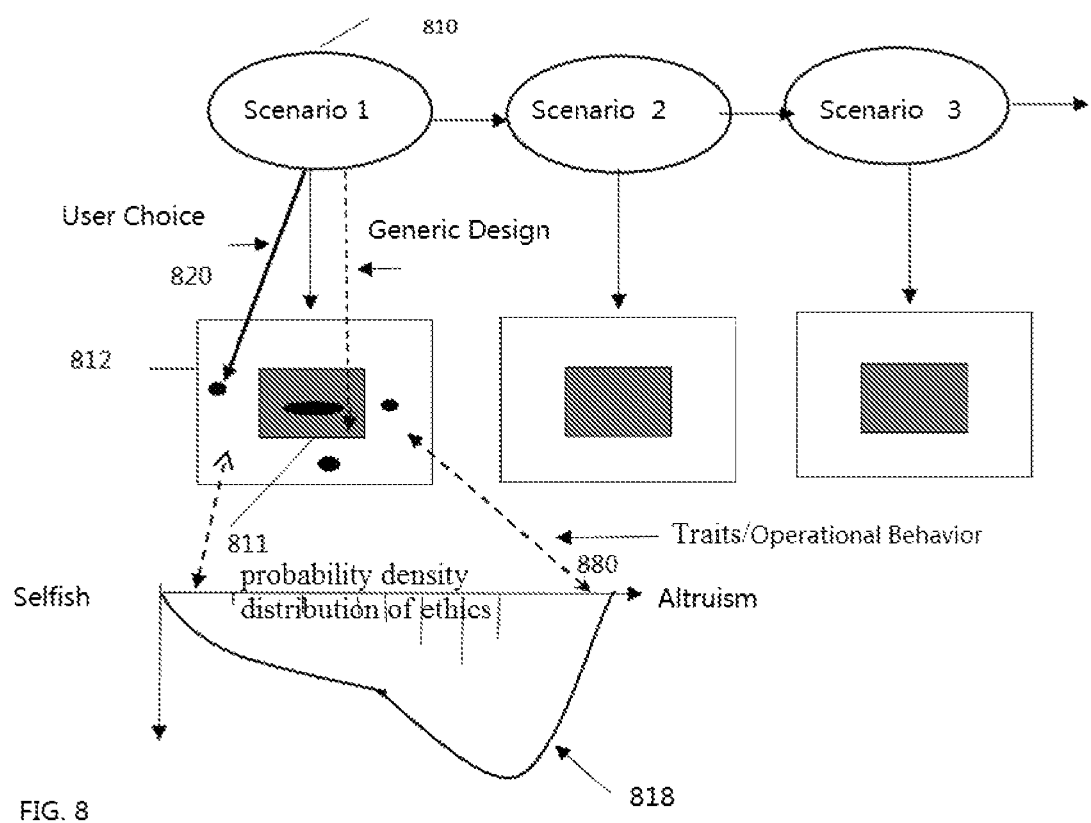

FIG. 8 Illustration an expansion of FIG. 7. module 880 is a double arrow head indicating a probabilistic correlation between traits of different ethics groups of users to different preferred operation behaviors in a scenario, while module 881 indicating a probability density distribution of user ethics groups. module 818 indicate the probabilistic relationship between user traits to user preferred operation behaviors in design of a training collection and in applying the user profile data assisting vehicle operation.

DETAILED DESCRIPTION OF THE INVENTION

The following descriptions and illustrated example embodiments are intended to explain the invention without limiting the scope of this invention.

Scenario hereafter in this disclosure is defined as a data set of a snapshot or a sequence of snapshots of factors in a driving situation that impact a driving operation of a self-driving motor vehicle, comprising for example: natural environment comprising seasons, weather, and temperature and humidity; social environment comprising social order, governing laws including traffic laws and rules, and community ethics in driving; roadway conditions comprising number of lanes, local driveways or divided multiple lane freeways, ground types, traffic control signals, road signs and obstacles; roadway sharing objects comprising pedestrians, non-motor vehicles, other motor vehicles, sideway scenes, sideway buildings or other objects and/or views that could block the sight of a driver or the Sensing System of a self-driving motor vehicle; traffic conditions comprising the visibility of conventional driver and of a self-driving motor vehicle, degree of congestion, the traffic speed and number of passing motor vehicles/number of lanes in a road section; operation conditions of a self-driving motor vehicle comprising speed, response time to driving events, mechanical and electrical performances and number of passengers on board. The data set of a scenario comprises a descriptive data part and optionally an implementation-dependent numeric data part, which are measured, categorized, encoded, quantized and structured numeric data of data in the descriptive data part.

A user denotes a passenger and/or a rider and/or an owner of a self-driving motor vehicle who is also a passenger or a rider.

A training collection denotes a training collection of data of a plurality of scenarios and a collection of data of operation behaviors of a self-driving motor vehicle in each of the scenarios, wherein the operation behaviors comprising one basic vehicle operation or a synchronized sequence of basic vehicle operations comprising speeding up, speeding down, moving forward or backing up, making turns, braking, lights and sound controls, and the data comprising a descriptive data part and optionally an implementation-dependent numeric data part, which comprises measured, categorized, encoded, quantized and structured numeric data of data in the descriptive data part. Further, as an example of design, a training collection may comprise a Coordinate Matching Range Vector Set associating with each scenario and each of operation behaviors in the scenario for facilitating scenario matching during a driving.

A self-driving motor vehicle keeps monitoring scenarios during a driving including roadway traffic and the vehicle conditions by its Sensing System, and any event prompting for a responding adjustment of its operation could be analyzed to fall into one of the three conceptually categorized response time intervals, taking into account the distance of an involved object to and the speed of the vehicle, the time needed for the robot to run algorithms and Activation System, and for the activation to take effect, as illustrated in FIG. 2. The parameters separating the zones are a range of values overlapping between the adjacent zones, which are vehicle model dependent and scenario dependent. The interval between time 0 to T1 is hereby referred to as The Blinking Zone, wherein the robot can virtually do little or nothing to address an event or avoid an accident except to minimize the damages and send out alarms if there is an accident. The interval between T1 to T2 is referred to as The Emergency Zone, wherein actions could be taken to address an event or avoid an accident or let an accident happen in one way or another that would put different risks of damages to the user, the vehicle of the user and/or other parties who are involved in the accident comprising other vehicles or pedestrians who happens to share the roadway at the time. The interval from T2 beyond is referred to as the Cruise Zone, wherein the roadway and traffic events are easily manageable, and chance of an accident is very small. Corresponding to each interval, there are sets of data acquired reflecting attributes of a user comprising preferred behaviors in various scenarios, preferred driving styles, and/or moral or ethics traits, which will be used by the robot in control of the vehicle operations.

From customizing vehicle operation point of view, scenarios could be alternatively categorized into a first set named hereby as the Class I Scenarios, wherein driving could be managed by a Control System customized according to the driving style of a user and/or operating essentially based on a generic factory design without a need for customization, and a second set named hereby as the Class II Scenarios wherein the vehicle operation would require a customized operation according to a pre-acquired preferred operation behavior of a user in a scenario and traits of a user. The scenarios in the second set comprise for example presence of a conflict of interests involving attributes of a user comprising moral and/or ethics traits, and/or traffic rules and laws, and/or risks to safety of a user and/or a self-driving motor vehicle and/or other parties sharing roadways, and/or presence of an uncertainty of operating a self-driving motor vehicle to match the intention of a user in response to abrupt events during a driving. To optimize driving by customizing the operation behavior of a self-driving motor vehicle, the self-driving motor vehicle is trained prior to its being granted a license to carry a passenger in a practical service on a public roadway by two distinctive yet correlated user data sets comprising a user profile data set and a scenario-user-choice pair data set. The term of scenario-user-choice pair is an abbreviation for "scenario and user choice pair" indicating a paired combination between a scenario and a preferred user choice of an operation behavior of a self-driving motor vehicle in the scenario, as illustrated in FIG. 7. A scenario-user-choice pair data set comprise entries of all users, wherein each entry matches an individual user comprising all the scenario-user-choice pairs of the user in a form of a data structure. Subsequently, each scenario-user-choice pair comprises a descriptive data part of a scenario and a user choice of an operation behavior in the scenario and optionally an implementation-dependent numeric data part comprising measured, categorized, encoded, quantized and structured numeric data of data in the descriptive data part. A user profile data set comprises entries of all users, wherein each entry matches an individual user comprising a user background section and a user traits section, and each section is comprised a descriptive data part and optionally an implementation-dependent numeric data part comprising measured, categorized, encoded, quantized and structured numeric data of data in the descriptive data part in both sections. The organization of the data structures in the data sets is intended to make data in the descriptive data part accessible by any implementers, and as an interface to users during training self-driving motor vehicles, while data in the numeric data part is for facilitating real-time processing by a Control System, and therefore is implementation-dependent. The concept behind a scenario-user-choice pair comes from the observation that there could be multiple options to operate the vehicle in a scenario, and a Control System might have difficulty to figure out an optimal solution matching the intention of a current user, without prior knowledge of the attributes and/or preferences of the current user. The background section of a user profile data comprises data of a user including age, gender, body height, body weight, profession, marriage status, living area, education level, searchable public records comprising of driving, medical, disability, insurance, credit, and crimes; while the traits section comprises data of a user of driving and/or riding styles, and/or the moral and/or ethics traits of a user.

To acquire a scenario-user-choice pair data set, a training collection is obtained by designing a training collection and/or receiving a designed training collection or a combination of designing and receiving. A training collection are verified and/or verifiable by simulation and/or road tests and each of the collection of operation behaviors of a self-driving motor vehicle in each of the scenarios in a training collection are lawful. Design of a training collection and verification of a training collection by simulation and/or analysis of the statistical driving data is feasible within the state of the art, while verification by road tests is also feasible in at least part of the scenarios in a training collection, though less efficient. A training collection could be designed by a manufacturer of self-driving motor vehicles and/or an institution other than a manufacturer of self-driving motor vehicles and/or an individual designer for a specific vehicle model or as a design for a range of vehicle models, in accordance with the laws and rules of areas or countries wherever the self-driving motor vehicles are to be used by applying sophisticated algorithms of artificial intelligence or by trained professionals operating some relatively simple statistical tools processing data from conventional vehicle driving records, simulation and/or road tests of self-driving motor vehicles, community driving behaviors and/or moral and/or ethics traits of the areas and/or the countries.

Below is a description of an embodiment of such a design, which serves to illustrate the invention without limiting the scope of the invention.

C1. picking up scenarios into a training collection:

collecting data of a collection of scenarios into a candidate set of a training collection based on a statistical analysis of data of motor vehicle driving records, and/or data from simulation of motor vehicle driving;

assigning a first weighting factor Wc11 to each of the scenarios in the set, wherein the value of Wc11 comprising proportional to appearance probability of the scenario based on a statistical analysis of the data of the scenarios in the candidate set;

assigning a second weighting factor Wc12 to each of the scenarios, wherein the value of Wc12 comprising proportional to level of risk of safety of and/or damage to properties of parties involved in the scenario in relation to the intention of different drivers operating a motor vehicle in the scenario based on a statistical analysis of the data of the scenarios in the candidate set;

assigning a third weighting factor Wc13 to a scenario, wherein the value of Wc13 comprising proportional to level of uncertain of operating a motor vehicle in relation to the intention of different drivers in response to abrupt driving events in the scenario based on a statistical analysis of the data of the scenarios in the candidate set;

finding a combined weight Wc10 comprising by a weighting average of the three weighting factors;

sorting the candidate set in a descending order of the combined weight Wc10;

selecting data of scenarios in the candidate set into the training collection referencing in a top-down order to the combined weight Wc10, until the combined weight Wc10 being smaller than a first adjustable threshold Wc1t;

C2. finding a candidate data set of a collection of lawful operation behaviors in each scenario in the training collection:

finding a candidate data set of operation behaviors for each scenario in the training collection from a collection of data of operation behaviors in the scenario based on a statistical analysis of data of motor vehicle driving records, and/or data from simulation of motor vehicle driving;

finding the probability of appearance of each of the operation behaviors in the candidate set by a statistical analysis;

removing from the candidate set of data of operation behaviors unlawful operation behaviors;

removing from the candidate set of data of operation behaviors with probability of appearance smaller than a second adjustable threshold Pc2;

C3. establishing user groups with similar psychological behavior pattern of moral and/or ethics traits:

establishing a psychological behavior probability density distribution based on a statistical analysis of data of motor vehicle driving records, and/or data from simulation of motor vehicle driving relating the moral and/or ethics traits of a congregation of drivers and/or passengers, comprising:

forming a one-dimensional probability density distribution between extreme selfish at one side and altruism at the other side, or a multiple dimensional user psychological behavior probability density distribution, and dividing by an adjustable segment probability value the entire distribution domain into a plurality of segments wherein each segment corresponding to a congregation of a group of users with similar psychological behavior pattern of moral and/or ethics traits;

removing user groups with a segment probability smaller than a third adjustable threshold Pc3;

C4. electing an operation behavior from the candidate set of operation behaviors associating with data of a scenario in a training collection:

determining based on a statistical analysis of data of motor vehicle driving records, and/or data from simulation of motor vehicle driving and data of driving style and/or moral and/or ethics traits of drivers and/or passengers a probability P32[i][j] for a resulting user group i in step C3 to select an operation behavior j in the resulting candidate set of data of operation behaviors in step C2, wherein i=(1,2 . . . , L), j=(1, 2 . . . , M); L denotes the number of the total resulting user groups in step of C3 and M denotes the number of total operation behaviors in a resulting candidate set in step of C2;

electing an operation behavior from the resulting candidate set in step of C2 into the training collection as an operation behavior for a user to choose to form a scenario-user-choice pair if the probability P32[i][j] being larger than an adjustable threshold P32t, or a user group dependent adjustable threshold P32t[i];

removing from the resulting candidate set the operation behavior elected above to avoid duplicating;

C5. optimizing the design for achieving a balancing between coverage of the scopes of the data and efficiency in actual usage of a training collection by adjusting the involved thresholds and factors;

C6. calculating a Coordinate Matching Range Vector Set associating with data of each scenario and data of each operation behavior in the scenario in the training collection for scenario matching in a driving, wherein:

an algorithm for scenario matching comprising:

representing by a vector Cij in real space the numeric data part of a scenario in a training collection measured, categorized, encoded, quantized and structured using a protocol of data in the descriptive data part of the scenario, $$Cij=(Cij[1], \ldots Cij[n]), \quad [1]$$

wherein Cij[k] is the coordinate of the $K^{th}$ component of vector Cij and (k=1, 2 . . . n), 0<Cij[k]≤1;

representing by a vector of n dimension Ci in real space the numeric data part of a current scenario measured, categorized, encoded, quantized and structured using the same protocol of data in the descriptive data part of the scenario, $$Ci=(Ci[1], \ldots Ci[n]), \quad [2]$$

wherein Ci[k] is coordinate of the $K^{th}$ component of vector Ci and (k=1, 2 . . . n), 0<Ci[k]≤1; and hereafter in this example implementation, any coordinate segment between two coordinate boundary values of a component of a vector form a coordinate range of the component of the vector, wherein each coordinate represent a corresponding monotonic measurement of a factor of the data set of a scenario, such that if any two boundary values of a coordinate segment satisfy a matching condition, all the coordinates within the segment satisfy the matching condition;

letting Sij representing a similarity measurement between the two vectors Ci and Cij, and $$Sij=(\Sigma(Ci[k]-Cij[k])\hat{\ }2\times\alpha_k/(n\times\Sigma\alpha_k))\hat{\ }0.5, \quad (k=1, 2, \ldots, n), \quad [3]$$

wherein $\alpha_k$ is a weighting factor for coordinate of the $K^{th}$ component, $$0<Cij[k]\leq 1;\ 0<Ci[k]\leq 1;\ 0<\alpha_k\leq 1;$$

if Sij is smaller than an adjustable threshold Tij:

determining a Matching Boundary Vector Cijb around Cij based on a statistical analysis of data of motor vehicle records and/or data from simulations and road tests of self-driving motor vehicles, and $$Cijb=[(Cijb\min[1], Cijb\max[1]), \ldots (Cijb\min[n], Cijb\max[n])], \quad [4]$$

wherein 0<Cijbmin[k]≤1, 0<Cijbmax[k]≤1, and

Cijbmin[k] is the minimum coordinate of the $k^{th}$ component of Cijb, and Cijbmax[k] is the maximum coordinate of the $k^{th}$ component of Cijb, (k=1, 2, . . . , n);

Cijbmin[k]≤Cij [k]≤Cijbmax[k], (k=1, 2, . . . , n);

and Ci[k] is also within a range of a Matching Boundary Vector Cijb,

Cijbmin[k]≤Ci[k]≤Cijbmax[k], (k=1, 2, . . . , n);

letting Pij representing an operation behavior in scenario Cij, if Pij is as effective in scenario Ci or the probability for Pij to be as effective in scenario Ci is larger than an adjustable threshold Wij, asserting scenario Ci to be a match for scenario Cij under the condition of Pij;

narrowing down and/or refining the search range comprising:

using a range granularity adjusting factor m equally dividing the range of each coordinate of each component of Coordinates Matching Range Vector Cijb into m congruent segments with a range threshold Tijbs[k] calculated by:

$$Tijbs[k]=(Cijb\max[k]-Cijb\min[k])/m;\ (k=1, 2, \ldots, n); \quad [5]$$

expanding the Coordinates Matching Range Vector Cijb into an array Cijba comprising coordinate segments with smaller range values in each component, and $$Cijba = \begin{matrix} (Cijb\min[1][1], & (Cijb\min[1][2], & \ldots, & (Cijb\min[1][m], \\ Cijb\max[1][1]), & Cijb\max[1][2]), & & Cijb\max[1][m]) \\ \vdots & \vdots & \ldots, & \vdots \\ (Cijb\min[n][1], & (Cijb\min[n][2], & \ldots, & (Cijb\min[n][m], \\ Cijb\max[n][1]) & Cijb\max[n][n]) & & Cijb\max[n][m]) \end{matrix} \quad [6]$$

wherein,

Cijbmin[k][1]is the minimum value of the $L^{th}$ segment of the $K^{th}$ component of the Coordinates Matching Range Vector Cijb, and Cijbmax[k][1]is the maximum value of the $L^{th}$ segment of the $K^{th}$ component of the Coordinates Matching Range Vector Cijb, and Cijbmax[k][1]=Cijbmin [k][1+1], (k=1, 2, n) (1=1, 2, . . . , m−1), Cijbmax [k][1] is equal to Cijbmin[k]; and Cijbmax [k][m] is equal to Cijbmax[k], respectively;

constructing a candidate matching vector of a scenario $C_{ji}$ comprised of n coordinates with each of the coordinates from a coordinate of a boundary point in a row of Cijba;

finding all the vector $C_{ji}$ matching Cij based on the algorithm for scenario matching through a total of n^m tests and putting the matching vectors into a candidate set;

constructing a Coordinate Matching Range Vector Cijr, wherein each coordinate is composed of a pair of coordinates comprising a first coordinate from a coordinate of a component of a vector in the candidate set and a second coordinate from a coordinate of the same component of vector Cij, wherein the range of the pair of coordinates comprising a matching range of the coordinate values of the component;

fine-tuning the range granularity adjusting factor m to achieve a compromise between the granularity of search range, the computation complexity online and offline, and the data size of Coordinate Matching Range Vectors;

C7. organizing all Coordinate Matching Range Vectors into a structured Coordinate Matching Range Vector Set Cijra associating with data of each of the scenarios and data of each of the operation behaviors in the each of the scenarios in the training collection.

For a scenario-user-choice pair in a scenario-user-choice pair data set, the Coordinate Matching Range Vector Set that comes along with a scenario-user-choice pair demands a considerable real-time storage space. However, generating the Coordinate Matching Range Vector Set could be conducted off the line and/or during design of a training collection, which does not consume real-time computing resources. These data sets could be further compressed and structured prior to and/or after being acquired in a scenario-user-choice pair data set and stored in a real-time storage media. A combination of a real-time matching algorithm with a searching-based matching could provide a balanced space-time trade-off.

It should be noted that the above embodiment of designing a training collection is only an illustrative implementation, and different methods comprising multilayered relational data base could be deployed to get scenarios measured, categorized, encoded, quantized and structured, and scenarios matching could find various implementations in state of art self-driving motor vehicles designs by techniques including machine learning and artificial intelligence.

Customizing a self-driving motor vehicle starts by acquiring a scenario-user-choice pair data set based on a training collection in an initialization process, which could take place in manufacture of a self-driving motor vehicle and/or before the vehicle is practically used on a public roadway. The initialization process is carried out by a testing apparatus comprising a stand-alone testing apparatus and/or a human tester operating a testing apparatus and/or a robot of a self-driving motor vehicle, using a multi-media human-machine interface conducting the steps of:

identifying a user;

informing the user of a user choice of an operation behavior in a scenario comprising a binding commitment between a self-driving motor vehicle and the user, wherein the self-driving motor vehicle operates according to the operation behavior of the user choice in a matched scenario, the user assumes at least partial responsibility for the consequence of the operation behavior;

obtaining a consent from the user to the binding commitment;

presenting to the user data of one scenario at a time of the scenarios in a training collection and data of each of operation behaviors of a self-driving vehicle in the scenario in the training collection;

informing the user of the at least partial responsibility for the consequence of the each of the operation behaviors in the scenario;

obtaining a choice from the user of an operation behavior in the scenario to form a scenario-user-choice pair of the scenario and the operation behavior;

storing data of the scenario-user-choice pair in an entry of the user in a scenario-user-choice pair data set;

repeating the steps from presenting to storing for every scenario in the training collection; and/or receiving obtained data of scenario-user-choice pairs into an entry of the user in a scenario-user-choice pair data set of a self-driving motor vehicle and confirming and/or updating the scenario-user-choice pair data set with the user prior to the self-driving motor vehicle being practically used by the user in a service on a public roadway.

A description of the partial responsibility and/or consequence of the operating for a scenario-user-choice pair is illustrated in The Example 1 below.

The interactive interface between a testing apparatus and the user could be of a visual media comprising a touch screen panel for display and input, or an audio media comprising a speaker announcement combined with a microphone and a speech recognition module to take the inputs, or a combination thereof, for users without vision or hearing disabilities.

For user with disabilities, however, an assistant to the user could help with the initialization to use the above interactive interfaces, or an adaptive device could be designed and installed.

In addition to a scenario-user-choice pair data set, a user profile data set is also acquired in an initialization process. Data in the background section of a user profile data set are acquired before a user purchases or is granted a permit to use a service of a self-driving motor vehicle and/or before a user driving a self-driving motor vehicles on a public roadway in a practical service, by a testing apparatus through a human-machine interactive interface to obtain information provided by a user and/or research by a testing apparatus through a wireless communication system or an electronic media device wherein relevant user data are stored. The obtained background data of the user are stored in the background section of the entry of the user in a user profile data set.

A testing apparatus extracts trait of the user by analyzing the acquired data of the user in the scenario-user-choice pair data set and background data in the background section of the user profile data set based on behavior modeling, factory tests and statistical driving records and get the extracted user traits data stored in the traits section of the entry of the user in a user profile data set. The scenario-user-choice pair data set and/or the user profile data set data sets could be partially or fully acquired in manufacture of a self-driving motor vehicle and/or prior to a user purchasing a self-driving motor vehicle and delivered to the robot of a self-driving motor vehicle and be confirmed and updated if necessary by a testing apparatus and a current user before a self-driving motor vehicle is practically used on a public roadway.

An example of impact on operation by scenario-user-choice pair data is illustrated in FIG. 4 Table 1. Since how to handle events in the Emergency Zone between T1 and T2 is most critical and controversial to the safety behavior of a self-driving motor vehicle, some examples are designed and given below as an illustration.

Example 1: A self-driving motor vehicle is driving on a roadway at a normal speed approaching an intersection with a green light, a bicycle suddenly runs red light from one side of the roadway appearing in front of the self-driving motor vehicle. The robot finds braking the vehicle is too late to avoid the accident, but swing the vehicle to the left or right might have a chance, which would violate the traffic rules by running into a wrong lane and have a chance to damage the self-driving motor vehicle, which would be your choice:

A. Brake the vehicle

B. Swing the vehicle.

Example 2: At what risk degree between 0 and 1 would you take to damage your vehicle or harm yourself to avoid running over pedestrians (0 indicates none, 1 indicates full)?

A. 0

B. 1

C. 0.5

D. Undecided.

Example 3: When a collision between the self-driving motor vehicle and another vehicle is unavoidable, which of the following would you choose?

A. Minimize the damage to yourself no matter what happens to the other party

B. Minimize the damage to yourself no matter what happens to the other party if the other party has the liability C. Take some risk of damaging yourself depending the circumstances to reduce the damage to the other party.

Example 4: When an accident is unavoidable, which of the following would you choose?

A. Minimize the damage to the passenger sitting on the front-left seat

B. Minimize the damage to the passenger sitting on the back-right seat

C. Minimize the damage to myself no matter where I am sitting.

Example 5: Your preferred driving style in highway is:

A. Smooth and steady

B. Swift and jerky

C. Aggressive with sport flavor.

An illustration to how to apply the two sets of user data in a real-time operation is given in FIG. 5. A robot or a service provider or a user of a self-driving motor vehicle identifies a current user to be the current user, by identifying a current rider or a passenger, or one of current riders or passengers of a self-driving motor vehicle being a user having acquired data in the entry of the user in a scenario-user-choice pair data set and/or having acquired data in the entry of the user in a scenario-user-choice pair data set and the entry of the user in a user profile data set prior to a self-driving motor vehicle being practically used on a public roadway. When multiple users are riding a self-driving motor vehicle, it is mandatory to select one of the riders as the current user and apply scenario-user-choice pair data of the current user in the scenario-user-choice pair data set or refer to user profile data of the current user in the user profile data set in assisting the operation of the vehicle. In case there is no passenger riding the vehicle, a default or selective set of factory settings, or scenario-user-choice pair data and/or user profile data of a designated user could be elected in assisting the vehicle operation.

A self-driving motor vehicle should follow the rules and laws regarding vehicle operations in the first place. In response to a scenario during a driving, the robot tries firstly to find a match between a current scenario and a scenario in a scenario-user-choice pair in the entry of the current user in the scenario-user-choice pair data set, and operates the self-driving motor vehicle according to the operation behavior of user choice in the scenario-user-choice pair if the match is found, wherein if the current user is a current rider, the current user assumes at least partial responsibilities for consequences of the operating. The robot proceeds to generate one or more optional operation behaviors of the self-driving motor vehicle if the match is not found, and in case of more than one optional operation behaviors being generated, estimate probability for the current user to choose each of the operation behaviors referencing data in the entry of the current user in the user profile data set and data from statistical analysis of data of motor vehicle driving records and/or psychological behavior of drivers, and electing an operation behavior having the largest probability to operate the self-driving motor vehicle.

Sensing and matching a current scenario with an internal scenario representation in a self-driving motor vehicle are both rudimentary and essential for operating a self-driving motor vehicle. Given that many testing self-driving motor vehicles have been on the road for a few years, it is safe and sound to assume scenario matching has been an enabling procedure in the prior art of a self-driving motor vehicle design, though room for improvements exists. Since the intention of this invention is to apply scenario matching in customizing a self-driving motor vehicle, this disclosure does not intend to elaborate on its implementations, though some illustrative examples are introduced below based on the illustrated design of a training collection:

Example I

Generate a vector Ci of a current scenario using the same protocol to a scenario in the training collection design embodiment previously presented in this specification, Ci=(Ci[1], . . . Ci[n]), where Ci[k] is coordinate of the $K^{th}$ component of Ci, (k=1, 2, . . . , n), and $0<Ci[k]\leq 1$;

Let Cj be a vector of n dimension representing a scenario in the scenario-user-choice pair data set, Cj=Cj[1], . . . Cj[n]), wherein Cj[k] is coordinate of the $K^{th}$ component Cj, (k=1, 2, . . . , n), and $0<Cj[k]\leq 1$.

Calculate similarity Sij:

$Sij=(\Sigma(Ci[k]-Cj[k])\hat{}2\times\alpha_k/(n\times\Sigma\alpha_k))\hat{}0.5$, (k=1, 2, . . . , n), wherein $\alpha_k$ is a weighting factor for the $k^{th}$ coordinate of Cj, $0<Cj[k]\leq 1$; $0<\alpha_k\leq 1$; Ci[k] and Cj[k] are matching coordinate components of Ci and Cj.

if Sij is smaller than an adjustable threshold Tj, and Ci[k] is within the coordinate range of a Matching Boundary Vector Cjb which is expressed as, Cjb=[(Cjmin[1], Cjmax[1]), . . . (Cjmin[n], Cjmax[n])], (k=1, 2, . . . , n)

wherein $0<Cjmin[k]\leq 1$; $0<Cjmax[k]\leq 1$; Cjmin[k] is the minimum coordinate value of the $k^{th}$ component of Cjb, Cjmax[k] is the maximum coordinate value of the $k^{th}$ component of Cjb;

$Cjmin[k]\leq Cj[k]\leq Cjmax[k]$, and if an operation behavior Pj in scenario Cj is as effective in scenario Ci or the probability for Pj to be as effective in scenario Ci is larger than a threshold Wj, scenario Ci is recognized to be a matching scenario for scenario Cj.

Example II

An alternative example embodiment to find a match of a current scenario to a scenario in the scenario-user-choice pair data set is by searching through Coordinate Matching Range Vector Set of all the scenarios in the scenario-user-choice pair data set, Generate a vector Ci of a current scenario using the same protocol to a scenario in the training collection design embodiment previously presented in this specification, Ci=Ci[1], . . . Ci[n], wherein Ci[k] is coordinate of $K^{th}$ component of Ci, (k=1, 2, . . . n), and 0<Ci[k]≤1;

Search through all Coordinate Matching Range Vector Sets of all the scenarios in the scenario-user-choice pair data set, if coordinate of each component of vector Ci is found in a coordinate range of the corresponding component of a Coordinate Matching Range Vector of scenario Cj, scenario Cj is recognized to be a matching scenario for scenario Ci.

A simple example of applying scenario matching in a driving is as follows:

for a scenario Ci:

a self-driving motor vehicle is driving in a local roadway at a speed of 25 m/h; a pedestrian is crossing a local roadway 10 meter ahead;

operation behavior of user choice Pi in the scenario Ci is: break to stop to avoid an accident;

assuming other factors are the same, a matching range of Ci for driving speed is 28-33 m/hour;

if in a current scenario Cj, driving speed is detected to be 32 m/hour, the current scenario Cj is therefore determined to match scenario Ci and operation behavior of user choice brake to stop to avoid an accident Pi is executed.

One example of categorizing the traits of a user into one of the following groups in response to events in the Emergency Zone is illustrated in Example 4 as follows:

A. Habitual traffic violation offenders

B. Strict traffic rule followers

C. Smart and flexible drivers

D. Altruism volunteer heroes

It should be noted generating based on each category of user traits a preferred operation behavior of the vehicle is only of a probability nature. For example, in the Example 1 of the previously listed five example scenarios, although there is a chance with a large probability for traits B group users to select the answer A "brake", while traits C group users might select the answer B "swing", it should not be assumed to be an affirmative action, of which the current user is not committed to take any responsibility for the consequence of the operation. For events in the Cruise Zone, a categorization based on user driving styles in Example 5 is as follows:

A. Smooth and steady

B. Swift and jerky

C. Aggressive with sport flavor, which could be rendered in the vehicle operations in favor of a user choice or style when it is safe and lawful. Certain restrictions are applied as a default setting for self-driving motor vehicles in general. For example, since this disclosure is not concerned about the application to use the driver-less technology for a battle vehicle in a war or for a vehicle for law enforcement, the self-driving motor vehicle is to be inhibited to be engaged in any offensive action against any third parties, including pedestrians, other vehicles etc. It should also be barred from any self-destruction behavior comprising running out of a cliff or against a road barrier or walls of a building, unless the Control System of the robot determines such a move is necessary for reducing the seriousness of an otherwise unavoidable accident and the current user has optioned a choice of such an operation behavior in the scenario-user-choice pair data set. Although in general, applying user data in a scenario-user-choice pair data set or a user profile data set is in operating a self-driving motor vehicle is intended to satisfy experience and expectation of a user, there are exceptions on the contrary, for example, if a user riding a self-driving motor vehicle is found to be drunk by an alcoholic sensor, or to be a habitual reckless driving offender, certain functions including user overriding the robot for manually operating the vehicle should be restricted.

A continuing user customization by user adaptation and learning during driving is illustrated in FIG. 3 by module 380, particularly if the current user is a recurrent passenger or an owner of the vehicle. In a first example embodiment, a robot notifies the current user by prompting messages and/or making announcements, through visual, sound or other types of media about an unfamiliar and/or untrained and/or hazardous roadway and traffic condition and asks for a guidance or command from the current user, executing the guidance or command in operation upon receiving the guidance or command. Then the robot conducts evaluation of the effect or performance of the operation, and if the performance is satisfactory without an accident, generates data in the descriptive data part of the scenario from the driving records, and takes the guidance or command as a user choice of operation behavior to form a scenario-user-choice pair, and with an explicit consent from the user, inserts the descriptive data into the entry of the user in the scenario-user-choice pair data set. An explicit consent from the user is required to make sure that the user knows a new data item of a scenario-user-choice pair being added and commits to assume at least partial responsibility for the consequence for the operation behavior in a matched scenario as a result of inserting the new data item. The updated scenario-user-choice pair data set is checked and used to extract and update data in the traits section of the user profile data, and the updated data sets will be applied in the driving afterwards.

In another example embodiment, the current user could take over the driving physically when necessary if it is feasible in the design, and a similar process to that used in the first example embodiment could be used based on a recorded scenario and driving behavior by the current user, to update the two user data sets by the same procedures as or similar procedures to procedures in the first example, comprising the steps of:

recording and analyzing data of scenarios and driving behaviors of the current user physically taking over operation of a self-driving motor vehicle; conducting an evaluation of performance of the user operation and generating data of scenario-user-choice pairs based on data of the scenarios and data of the driving behaviors of the current user; inserting data of the scenario-user-choice pairs into the entry of the current user in the scenario-user-choice pair data set with explicit consent from the current user if the performances being satisfactory resulting in no accidents.

In another example embodiment, a robot could chat with a user through a human-machine interface and/or monitor a gaze, and/or a gesture of the current user, and/or use other procedures to detect and analyze the user's verbal, and/or tactile, and/or body languages reflecting his or her experiences and/or sentiments during the driving, and tune its operation accordingly, and the process could be used to expand and/or update the user profile data sets whenever applicable. Thereby, the customized operation of a self-driving motor could be incrementally refined.

The methods disclosed hereby could help resolve some of the controversial legal and/or moral issues including but not limited to those illustrated in the examples above. For instance, the manufacturer and/or the service provider and/or the insurance provider of a self-driving motor vehicle operating on default factory settings is usually supposed to assume all liabilities for the vehicle being used. However, acquiring and applying scenario-user-choice pair data in a scenario-user-choice pair data set establishes a commitment between the vehicle and a user, wherein if the vehicle faithfully executes a user choice of an operation behavior in a scenario matching a scenario in a scenario-user-choice pair in the entry of the current user in a scenario-user-choice pair data set, the current user assumes at least partial responsibilities for the consequences of the operation, which could resolve some of the controversial legal issues in addition to having the benefits of reducing areas of uncertainties and complexities in a Control System design.

One major hurdle in legalization of self-driving motor vehicles has been the concern over their impersonal and/or unpredictable behaviors in handling abrupt, and/or unpredicted and/or conflicting-interest events. In that regard, an industry standard of a customized driving protocol based on the methods for customizing driving of self-driving motor vehicles described above could serve as a means of legalizing self-driving motor vehicles, if accepted by the industry and the public as well after road tests and other necessary evaluation/verification processes. As an evidence of its efficacy of a utility, a training collection used for acquiring a scenario-user-choice pair data set could serve as a first module and performance criterion for such a protocol, since it reassures and manifests a well-defined verifiable and/or verified lawful operation behaviors accommodating any users, and an instance of a user customization by acquiring a scenario-user-choice data set based on a training collection as detailed above will result in nothing less than predictable lawful vehicle operations, as if a conventional motor vehicle is driven by a human driver with at least a better-than-average driving record. A comparison of operation behaviors between a customized and non-customized generic self-driving motor vehicle as illustrated in FIG. 7 serves as a support to the idea, wherein Module 711 denotes a range of uncertain and/or unpredictable operation behaviors without user customization, within the restraint of traffic rules and laws, while module 712 comprising 711, denoting a range of operation behaviors with user customization incorporating user attributes, within the restraint of broader laws comprising traffic rules and laws.

Based on core processes of the methods of customized driving described above, a customized driving protocol for a self-driving motor vehicle is presented as follows:

obtaining a training collection of data of a plurality of scenarios and a collection of data of operation behaviors of a self-driving motor vehicle in each of the scenarios, wherein the training collection are verified and/or verifiable by simulation and/or road tests and the operation behaviors of a self-driving motor vehicle in each of the scenarios are lawful;

acquiring a scenario-user-choice pair data set based on the training collection and acquiring a user profile data set of one or more users of the self-driving motor vehicle in manufacturing the self-driving motor vehicle and/or prior to driving the self-driving motor vehicle on a public roadway in a practical service;

identifying a current rider, or one of current riders of the self-driving motor vehicle to be the current user, wherein data have been acquired in the entry of the current user in the scenario-user-choice pair data set and in the entry of the current user in the user profile data set of the self-driving motor vehicle prior to the self-driving motor vehicle being practically used on a public roadway;

driving the self-driving motor vehicle based on data in the scenario-user-choice pair data set and/or the user profile data set, comprising:

finding a match between a current scenario and a scenario in a scenario-user-choice pair in the entry of the current user in the scenario-user-choice pair data set;

operating the self-driving motor vehicle according to the user choice in the scenario-user-choice pair if the match is found, and the current user assumes at least partial responsibilities for consequences of the operating, or generating operation behaviors of the self-driving motor vehicle if the match is not found and estimating probability for the current user to choose each of the operation behaviors referencing data in the entry of the current user in the user profile data set and data from statistical analysis of data of motor vehicle driving records and/or psychological behavior of drivers, and electing an operation behavior having the largest probability to operate the self-driving motor vehicle.

A self-driving motor vehicle operating driving according to the customized driving protocol should be eligible to apply for a license or permit to carry a passenger in a practical service, and a license or permit could be issued to the self-driving motor vehicle if other functionalities including electromechanical features and performance of the self-driving motor vehicle driving in scenarios other than in the training collection are also qualified.

Two procedures, namely Procedure I and Procedure II are introduced wherein a manufacturer of self-driving motor vehicles or an authorized or designated organization and/or individual evaluates if a self-driving motor vehicle could meet a first and/or a second performance criterion for operating according to the customized driving protocol and issues performance certificate to the self-driving motor vehicle meeting the first and/or the second performance criterion for applying for a license or permit to carry a passenger in a practical service, wherein each of the two Procedures comprises two similar tests and Procedure I comprising:

a first test examining the training collection for acquiring the scenario-user-choice pair data set adopted by a self-driving motor vehicle, checking the scope of coverage of the plurality of scenarios and the scope of coverage of the collection of operation behaviors in each of the scenarios, wherein the self-driving motor vehicle passes the test if the scope of coverage of the plurality of scenarios meets a first performance benchmark and the scope of the collection of operation behaviors meets a second performance benchmark, wherein the first performance benchmark comprises:

the plurality of scenarios in the training collection comprise a sub-set of scenarios in a reference training collection comprising all available Class II scenarios at the time of the test and the ratio of the number of the scenarios in the training collection over the number of the scenarios in the reference training collection is bigger than a first threshold Pt1, wherein the reference training collection could be obtained in a process such as in the example design of a training collection through the steps of C1-C7.

wherein the second performance benchmark comprises:

the collection of operation behaviors in a scenario comprise a sub-set of operation behaviors in the scenario of the reference training collection and an average value or a weighted average value respecting all the scenarios in the training collection of a ratio of the number of operation behaviors in a scenario in the training collection over the number of the operation behaviors in the scenario in the reference training collection is bigger than a second threshold Pt2, wherein values of the weighting factors to a ratio comprising depending upon the appearance probability and risk degree of the scenario.

a second test is conducted to verify the self-driving motor vehicle operating driving according to the customized driving protocol, and if the self-driving motor vehicle operates driving according to the customized driving protocol, it passes the second test.

the self-driving motor vehicle meets the first performance criterion if the self-driving motor vehicle passes the first test and the second test.

In Procedure II, however, a third performance criterion is adopted, wherein the first test examines the scenario-user-choice pair data set having acquired data in an entry of the current user in place of the training collection, while the second test is the same as in Procedure I. The data of the current user in the user profile data could also be checked to determine conditions if or how to provide the service to the current user, wherein the first test comprising:

examining the scenario-user-choice pair data set having acquired data in an entry of the current user, wherein the self-driving motor vehicle passes the first test if the scenarios in an entry of the current user in the scenario-user-choice pair data set comprise a sub-set of scenarios in a reference training collection comprising all available Class II scenarios at the time of the test and the ratio of the number of the scenarios in the user entry of the scenario-user-choice pair data set over the number of scenarios in the reference training collection is bigger than a third threshold Pt3, wherein the reference training collection could be obtained in a process such as in the example design of a training collection through the steps of C1-C7.

The training collection used as a first performance criterion for legalizing self-driving motor vehicles could be designed by a manufacturer of self-driving motor vehicles, and/or by an institution and/or an individual other than a manufacturer of self-driving motor vehicles in accordance with the rules and laws of an area, and/or of a city and/or of a state and/or of a country as a standard performance criterion.

Design of a training collection could be carried out by complicated algorithms or just by ordinary skilled professionals with adequate knowledge, experience and training using relatively simple statistical tools to process the statistical conventional vehicle operation data and/or data from simulation and/or road tests of self-driving motor vehicles correlating with moral and/or ethics traits of users and traffic rules and laws. Variations in controls and maneuverability of self-driving motor vehicles, and different rules and laws in different areas and/or countries require distinctive designs for a training collection as a first performance criterion for legalizing self-driving motor vehicles. However, the introduced performance criteria as part of the methods of customization of self-driving motor vehicles for legalizing self-driving motor vehicles is effective in increasing reliability and transparency in vehicle operation behaviors and reducing the worries and panics from the legislators and the public over their performance in high risk, uncertain and conflicting-interest scenarios.

Customizing a self-driving motor vehicle in manufacturing comprises an efficient design of a Control System, being capable of fast accessing and processing the data in a scenario-user-choice pair data set, and/or a user profile data set; running fast scenario matching; efficiently operating according to a user choice in a matched scenario and/or running probabilistic analysis of data in a user profile data set correlating operation behaviors generated by a Control System.

In addition to the scheme outlined above, a custom design based on acquiring the user data sets in manufacturing process will further reduce design complexity and time to service and increase reliability and productivity as well. The user attribute data comprising the scenario-user-choice pair data set and the user profile data set containing data of one or more users whom a customer design targets are acquired and imported to the vehicle being manufactured, and are integrated with the Control System and other parts of the vehicle, wherein simulations or road tests are run if needed, and the Control System and other parts of the vehicle are tuned to an optimal condition and settings of the vehicle are initialized according to specification of the custom design before delivering the vehicle to a customer.

Based on the methods and procedures of customizing and legalizing self-driving motor vehicles described above, hereby is introduced a system of customizing the operation of and legalizing self-driving motor vehicles, comprising:

Module 1, wherein a self-driving motor vehicle operating driving according to a customized driving protocol ; and Module 2, wherein a manufacturer of a self-driving motor vehicle or an authorized and/or designated organization and/or individual conducts tests evaluating the performance of the self-driving motor vehicle in Module 1 and issues a performance certificate to the self-driving motor vehicle for applying for a license or a permit to provide a service to carry a passenger, if the self-driving motor vehicle meets the performance criterion by passing the tests comprised in Procedure I and/or Procedure II described above.

In all, the methods and the system disclosed hereby should find them implementable by ordinary skilled professionals in the field, and the applicant would like to claim the rights and benefits to the scope of the disclosed invention as follows.

The invention claimed is:

1. A method of self-driving motor vehicle operation, comprising a self-driving motor vehicle performing the steps of:

acquiring a user profile data set;

acquiring a first data set of a rider of data of a plurality of scenarios and data of an operation behavior preferred by the rider in each of the plurality of scenarios prior to the self-driving motor vehicle carrying a passenger in a drive;

finding a match between a current driving scenario and a scenario in the first data set and executing an operation in the current driving scenario according to an operation behavior in the scenario in the first data set when the match is found;

generating one or more non-rider-specific operation behaviors of the self-driving motor vehicle when the match is not found;

estimating a probability value for the rider to choose each of the non-rider-specific operation behaviors referencing data of the rider in the user profile data set, and executing the operation according to the non-rider-specific operation behavior having the largest probability value.

2. The method of claim 1, wherein the acquiring the first data set of the rider comprises the steps of: identifying the rider; presenting to the rider the plurality of scenarios in a training collection and the one or more operation behaviors of the self-driving vehicle in the plurality of scenarios in the training collection of data; informing the rider of responsibilities for consequences of each of the operation behaviors in the plurality of scenarios in the training collection of data; obtaining a choice from the rider of one of the operation behaviors in each of the plurality of scenarios of the training collection data to form a scenario-user-choice pair of the respective scenario and the respective rider preferred operation behavior; storing the scenario-user-choice pair in the first data set; or receiving previously acquired scenario-user-choice pairs of into the first data set.

3. The method of claim 1, further comprising: using the first data set as a qualification for the self-driving motor vehicle to obtain a driving license or driving permit valid for the rider to purchase or use services of the self-driving motor vehicle.

* * * * *